US 6,642,741 B2

(12) United States Patent
Metz et al.

(10) Patent No.: US 6,642,741 B2
(45) Date of Patent: Nov. 4, 2003

(54) ELECTRONICALLY ADJUSTABLE INTEGRATED CIRCUIT INPUT/OUTPUT TERMINATION METHOD AND APPARATUS

(75) Inventors: Arthur J. Metz, Gervais, OR (US); Daniel G. Knierim, Beaverton, OR (US); Richard J. Huard, Beaverton, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 10/015,488

(22) Filed: Dec. 12, 2001

(65) Prior Publication Data

US 2002/0186041 A1 Dec. 12, 2002

Related U.S. Application Data

(60) Provisional application No. 60/295,366, filed on Jun. 1, 2001.

(51) Int. Cl.[7] .............................................. H03K 19/003
(52) U.S. Cl. ............................. 326/30; 326/26; 326/82
(58) Field of Search ........................... 326/26, 27, 30, 326/82, 83, 86, 87

(56) References Cited

U.S. PATENT DOCUMENTS

| 5,254,883 | A | * | 10/1993 | Horowitz et al. .............. 326/30 |
| 6,288,564 | B1 | * | 9/2001 | Hedberg ....................... 326/30 |
| 2001/0045843 | A1 | * | 11/2001 | Hernandez-Marti .......... 326/30 |
| 2002/0053923 | A1 | * | 5/2002 | Kim et al. ..................... 326/30 |

* cited by examiner

Primary Examiner—Don Le
(74) Attorney, Agent, or Firm—David N. Caracappa; Thomas F. Lenihan

(57) ABSTRACT

An integrated circuit includes a termination for a transmission line having a predetermined characteristic impedance. The termination includes a controllable impedance circuit, including a multiplier, coupled to the transmission line. A reference impedance, placed external to the integrated circuit, has an impedance related to the characteristic impedance of the transmission line. A control circuit is coupled between the reference impedance and the controllable impedance circuit, and conditions the controllable impedance circuit to have the characteristic impedance responsive to the reference impedance

20 Claims, 8 Drawing Sheets

ELECTRONICALLY ADJUSTABLE INTEGRATED CIRCUIT INPUT/OUTPUT TERMINATION METHOD AND APPARATUS

This application claims the benefit of Provisional Application No. 60/295,366, filed Jun. 1, 2001.

FIELD OF THE INVENTION

The present invention relates to a termination method and apparatus for input/output (I/O) terminals on an integrated circuit (IC).

BACKGROUND OF THE INVENTION

High speed/high frequency signals are often transmitted via specially designed signal carrying cables and/or circuit board traces, referred to as transmission lines, to minimize loss, interference, and signal distortion. It is well known that such transmission lines have characteristic impedances (designated $Z_0$). In order to minimize signal distortion due to reflections of the signal on the transmission line and to maximize power transfer through the transmission line, the output impedance of a transmission line driver and input impedance of a transmission line receiver must match the characteristic impedance of the transmission line to which they are connected. For example, one widely used coaxial cable (coax), designated RG-58, has a characteristic impedance of around 50 ohms. Thus, the input/output impedance of a coax receiver/driver circuit coupled to RG-58 coax should be 50 ohms.

Transmission lines are often coupled to transmission line drivers and/or receivers which are fabricated on an IC. On an IC, however, the absolute values of components cannot be controlled to relatively tight tolerances during fabrication. In addition, IC components have values which typically also vary with temperature, compounding the problem. Component value absolute tolerances of ±15% are typical. This means that any component designed and fabricated on the IC for terminating a transmission line having a characteristic impedance of $Z_0$ can have an absolute impedance of $Z_0 \pm 15\%$. The input impedance $Z_{in}$ of a transmission line receiver, and the output impedance $Z_{out}$ of a transmission line driver, however, may need a tolerance within ±1% for reasonable performance.

One known technique for controlling the I/O impedance of transmission lines connected to ICs is to use an external (i.e. off-chip) component to terminate each such connection. Use of an external component in this fashion will give an impedance tolerance which is as close as the tolerance of the external component. For the exemplary RG-58 coax, an external 1% 50 ohm resistor will provide an I/O termination impedance ±1%. However, this requires a separate external resistor, and an external resistor connecting pad, for each such connection. This, in turn, requires that the IC chip, which may be limited by the number of I/O pads available, include the additional pads for the external resistors. In addition, the module containing the IC chip must be specially designed to include the external resistors and connect them to the appropriate pads on the IC chip. Consequently, this is a relatively expensive solution.

A second known technique for controlling the I/O impedance of transmission line interface circuits in ICs is to perform a trim operation on the IC after fabrication, but before packaging. In this technique, an on-chip resistor is fabricated on the IC to provide the termination for the transmission line. This resistor is deliberately fabricated to have too low a resistance value. This is done by making the width of the resistor too wide. After the fabrication process, a piece of test equipment measures the actual value of the termination resistor (which can vary by ±15%). A laser wafer trim device is then used to trim the size of the resistor. As the resistor is trimmed in width, it becomes smaller, and the resistance increases. The test equipment trims the termination resistor until the resistance is the desired characteristic resistance of the transmission line.

This provides each transmission interface circuit with an accurate on-chip termination, but requires a laser trim step for each transmission line connection on each IC chip produced, and expensive laser trim test equipment. In addition, because the termination resistor is fabricated on-chip, it is subject to variation with temperature. To solve this problem, the process used to fabricate the termination resistor must be one which produces resistors with relatively low temperature coefficients. Also, the laser trim process may destroy the hermeticity of the IC passivation if it is not specifically designed for laser trimming. These requirements, however, may conflict with other process requirements for the IC. Thus few IC processes are available that allow laser trimming. Furthermore, the termination resistors must be physically placed on the IC chip so that it may be laser trimmed without adversely affecting adjacent components. This can require special placement, and unduly increase die size.

Another known technique is disclosed in U.S. Pat. No. 4,228,369, issued Oct. 14, 1980 to Anantha et al. In this patent, an electrically variable terminating resistor is fabricated on the IC to serve as a precision terminating resistor in the final load of a series of loads on the transmission line. However, electrically variable resistors introduce non-linearities in the signal due to the resistance changing with the signal voltage as well as the control voltage. In addition, electrically variable resistors have higher parasitic capacitances than many other integrated resistors, due to their fabrication in the bulk semiconductor.

An on-chip termination for connecting transmission lines to IC chips, which does not require a separate external pad and termination resistor for each such interface, nor expensive post-fabrication trimming for each chip, yet produces termination impedances with relatively tight absolute tolerances, low capacitances, and good linearity, is desirable.

SUMMARY OF THE INVENTION

In accordance with principles of the present invention, an integrated circuit includes a termination for a transmission line having a predetermined characteristic impedance. The termination includes a controllable impedance circuit, coupled to the transmission line. The controllable impedance circuit employs a multiplier to control the portion of the termination current or voltage fed back to the transmission line, thereby controlling the net impedance. A reference impedance, placed external to the integrated circuit, has an impedance related to the characteristic impedance of the transmission line. A control circuit is coupled between the reference impedance and the controllable impedance circuit, and conditions the controllable impedance circuit to have the characteristic impedance responsive to the reference impedance. Alternatively, other control means may be used to adjust the controllable impedance circuit to have the desired impedance.

DETAILED DESCRIPTION

Figure 1:
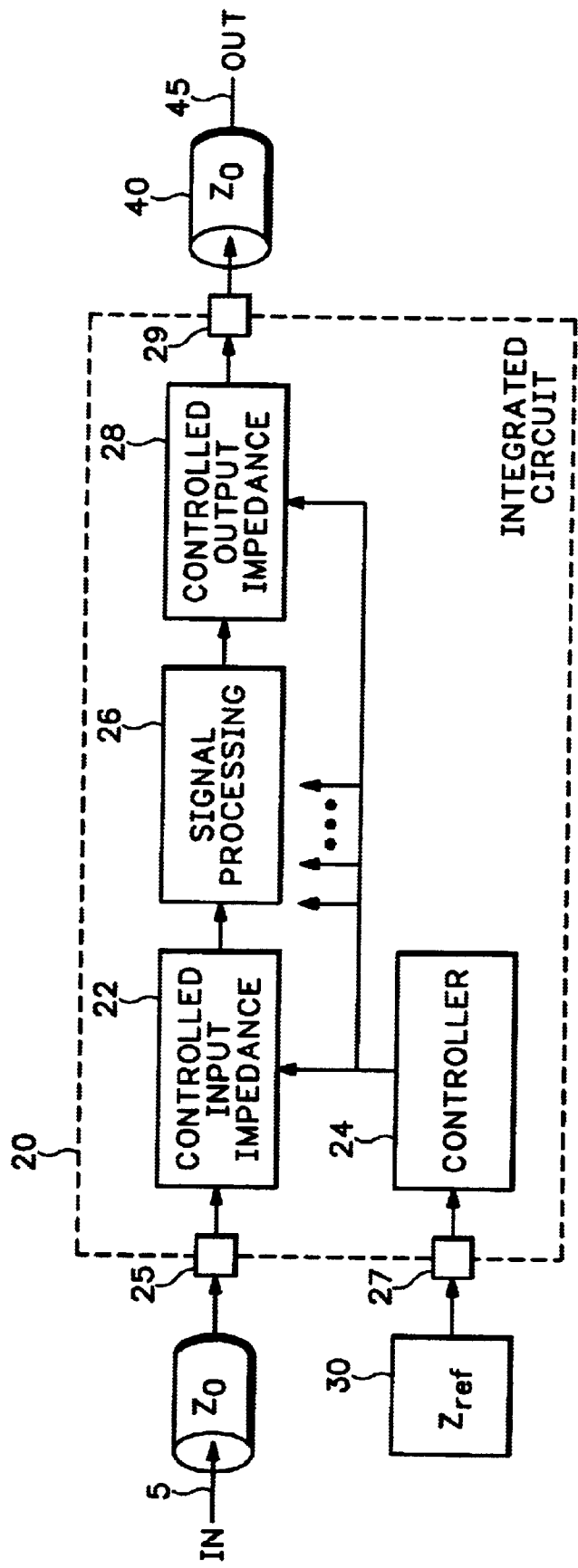
FIG. 1 is a block diagram of an integrated circuit according to the present invention.

FIG. 1 is a block diagram of an integrated circuit according to the present invention. In FIG. 1, an input terminal 5 is coupled to a source (not shown) of an input signal IN. Input terminal 5 is coupled to a first end of a transmission line 10 having a characteristic impedance of $Z_0$. Although illustrated in FIG. 1 as a coax cable, one skilled in the art will understand that the transmission line 10 may assume any form of transmission line. A second end of the transmission line 10 is coupled to an input pad 25 of an integrated circuit (IC) 20. Input pad 25 is coupled to a signal input terminal of a controllable input impedance circuit 22. A signal output terminal of the controlled input impedance circuit 22 is coupled to an input terminal of a signal processing circuit 26. An output terminal of the signal processing circuit 26 is coupled to an input terminal of a controlled output impedance circuit 28. An output terminal of the controlled output impedance circuit 28 is coupled to an output pad 29 of the IC 20. The output pad 29 is coupled to a first end of a second transmission line 40, also having a characteristic impedance of $Z_0$. An other end of the transmission line 40 is coupled to an output terminal 45. The output terminal 45 is coupled to utilization circuitry (not shown) for processing the output signal OUT.

A reference impedance 30, having an impedance $Z_{ref}$, which is related to the characteristic impedance of the transmission lines 10 and 40, is coupled to a reference input pad 27 of the IC 20. The reference input pad 27 is coupled to an input terminal of a controller 24. A control output terminal of the controller 24 is coupled to respective control input terminals of the controlled input impedance circuit 22 and the controlled output impedance circuit 28, as well as control input terminals of other controlled input impedance circuits and controlled output impedance circuits (not shown).

Although the system illustrated in FIG. 1 includes both an input terminal 25 and an output terminal 29 coupled to respective transmission lines (10 and 40) of the same characteristic impedance, one skilled in the art will understand that an IC may include only an input terminal or only an output terminal or input and output terminals of differing impedance. The signal processing circuit 26 is also illustrated in FIG. 1 as coupling the input terminal 25 to the output terminal 29. However, one skilled in the art will understand that any input terminal on the IC 20 may be completely isolated from any other output terminal, and the arrangement of FIG. 1 is illustrated solely for simplicity.

In operation, the value $Z_{ref}$ of the external reference impedance 30 is selected to be related to the characteristic impedance of the transmission line coupled to the IC 20. The tolerance of the value $Z_{ref}$ of the reference impedance 30 is selected to be relatively tight. The reference impedance $Z_{ref}$ is sensed by the controller 24. The controller 24 generates a control signal for the controllable input impedance circuit 22 and the controllable output impedance circuit 28 in a manner described in more detail below. This control signal conditions the controllable input impedance circuit 22 to present an input impedance equal to the characteristic impedance $Z_0$ to the transmission line 10, and conditions the controllable output impedance circuit 28 to present an output impedance $Z_0$ to the transmission line 40, in a manner to be described in more detail below.

By controlling the input and output impedance of transmission line interfaces by reference to an external impedance, the absolute tolerance of the input and output impedances can be controlled to relatively tight tolerances: as tight as that of the external reference impedance 30. However, only one external reference impedance 30 is required.

Thus, only one extra pad is required for the IC 20, and as this extra pad does not carry the high-speed signal, it need not be treated as carefully as a signal-carrying pad in the package and/or circuit board layout.

Figure 2:
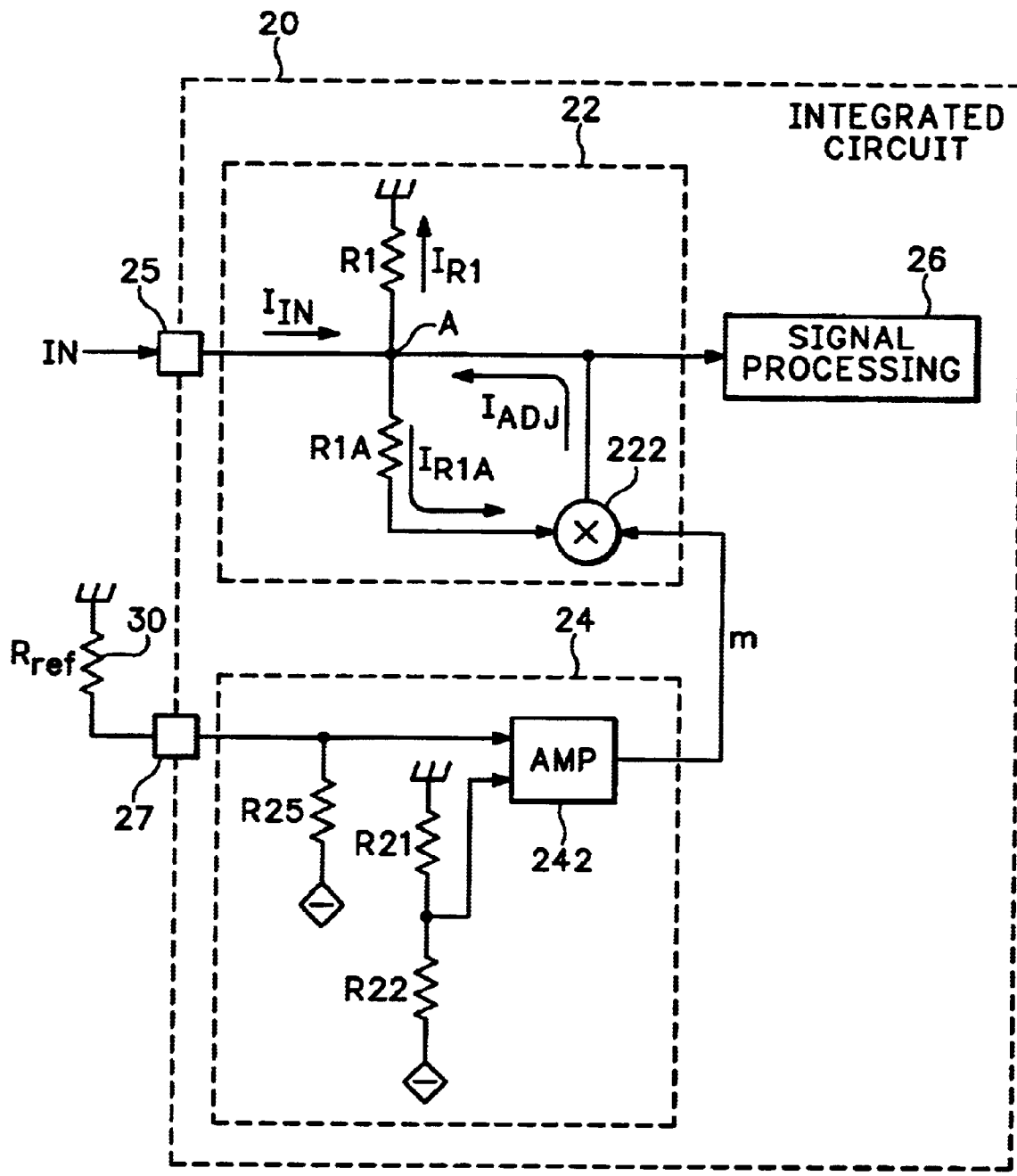
FIG. 2 is a more detailed diagram, partially in block form, and partially in schematic form, of a portion of the integrated circuit illustrated in FIG. 1.

FIG. 2 is a more detailed diagram, partially in block form, and partially in schematic form, of a portion of the integrated circuit 20 illustrated in FIG. 1. In FIG. 2, input pad 25 is coupled to the input terminal of the signal processing circuit 26, to respective first electrodes of a resistor R1 and a resistor R1A, and to an output terminal of a multiplier 222. A second electrode of the resistor R1 is coupled to a source of reference potential (ground). A second electrode of the resistor R1A is coupled to a first input terminal of the multiplier 222. The combination of the resistor R1, the resistor R1A and the multiplier 222 form the controlled input impedance circuit 22 (of FIG. 1).

In FIG. 2, the external reference impedance 30 is a resistor having a value $R_{ref}$. A first electrode of the external reference impedance 30 is coupled to ground and a second electrode is coupled to the reference input pad 27. Reference input pad 27 is coupled to a first electrode of a resistor R25 and a first input terminal of an amplifying circuit 242. A first electrode of a resistor R21 is coupled to a second input terminal of the amplifying circuit 242 and to a first electrode of a resistor R22. A second electrode of the resistor R21 is coupled to ground, and second electrodes of the resistors R22 and R25 are coupled to a source of a negative operating potential, illustrated by a diamond with a "−" sign inside it. An output terminal of the amplifying circuit 242 produces a multiplier signal m and is coupled to a second input terminal of the multiplier 222. The combination of the resistors R21, R22, and R25, and the amplifying circuit 242 form the control circuit 24 (of FIG. 1).

The operation of the controlled input impedance circuit 22 may be better understood by referring to the currents flowing through the respective circuit branches. The input current $I_{IN}$ from the input pad 25 flows into node A. A first current $I_{R1}$ flows from node A through resistor R1 to ground, and has the value $V_{IN}G_{R1}$, where $V_{IN}$ is the voltage at node A (which is the voltage at input node 25) and $G_{R1}$ is the conductance of resistor R1 (equal to 1/R1). A second current $I_{R1A}$ flows from node A through resistor R1A to the input of the multiplier 222, and has the value $V_{IN}G_{R1A}$ (assuming that the input terminal of the multiplier 222 is maintained at ground potential). A third current flows from the output terminal of multiplier 222 to the node A (assuming that the signal processing circuit 26 presents a relatively high input impedance to the controlled input impedance circuit 22) and has the value $I_{ADJ}$. The multiplier 222 generates the output current $I_{ADJ}$ having a value which is the product of the input current $I_{R1A}$ times a multiplier voltage m, i.e. $mI_{R1A}$, all in a manner to be described in more detail below.

The input impedance $R_{IN}$ is equivalent to an input conductance $1/G_{IN}$. The input conductance $G_{IN}$ is given in equation (1):

$$G_{IN} = \frac{I_{IN}}{V_{IN}} = G_{R1} + G_{R1A} - m*G_{R1A} \qquad (1)$$

where the multiplier m signal from the control circuit 24 runs from −1 to +1. The input conductance, thus, runs from $G_{R1} + 2G_{R1A}$ when m equals −1 to $G_{R1}$ when m equals 1. When m equals 0, the input conductance equals $G_{R1} + G_{R1A}$.

For an IC fabrication process producing an absolute component value tolerance of ±15% over process and temperature variation, the nominal conductance $G_{R1}$ of resistor R1 is selected to be $0.85G_0$, where $G_0$ is the characteristic conductance of the transmission line 10 (equal to $1/Z_0$). The nominal conductance of resistor R1A is selected to be $0.15G_0$. For the exemplary 50 Ω RG-58 transmission line, $Z_0$ is 50 Ω, and $G_0$ is 20 milliSiemens (mS). Resistor R1, thus, is designed to have a nominal resistance of 58.8 Ω, and a conductance $G_{R1}$ of 17 mS, and the resistor R1A is designed to have a resistance of 333.3 Ω, and a conductance $G_{R1A}$ of 3 mS. As described above, due to processing variations during fabrication of the IC and or temperature variations during use of the IC, the nominal resistances of these resistors can vary typically ±5%, while their values track each other relatively closely, typically ±0.5%.

Generally, if the fabrication process results in resistances which are substantially at their proper values, then the multiplier m is controlled by the control circuit 24 to have the value zero. In this case, the current $I_{ADJ}$ from the multiplier 222 is zero, and the input conductance $G_{IN}$, as given in equation (1), is $G_{R1} + G_{R1A}$. But $G_{R1}$ equals $0.85G_0$ and $G_{R1A}$ equals $0.15G_0$. Thus, in this case, $G_{IN}$ equals $(0.85+0.15) G_0$, which equals the characteristic of the transmission line $G_0$, i.e. $R_{IN} = Z_0$.

If the fabrication process results in resistances which are at the lower limit of 15% lower than nominal, then the multiplier m is set to +1 by the control circuit 24. In this case, the current $I_{ADJ}$ from the multiplier 222 is Vin $G_{R1A}$, and the input conductance $G_{IN}$ as given in equation (1), is $G_{R1} + G_{R1A} - G_{R1A}$, which, in turn, equals $G_{R1}$. The conductance $G_{R1}$ nominally equals $0.85G_0$, but the fabrication process has produced resistances at the lower limit of −15%, which makes $G_{R1}$, and hence the input conductance $G_{IN}$, equal to $G_0$, i.e. $R_{IN} = Z_0$.

If, on the other hand, the fabrication process results in resistances which are at the upper limit of 15% higher than nominal, then the multiplier m is set to −1 by the control circuit 24. In this case, the current $I_{ADJ}$ from the multiplier 222 is $-V_{in}*G_{R1A}$, and the input conductance $G_{IN}$ as given in equation (1), is $G_{R1} + 2G_{R1A}$. The conductance $G_{R1}$ nominally equals $0.85G_0$, and $G_{R1A}$ nominally equals $0.15G_0$. Thus, the nominal input conductance $G_{IN}$ would be $1.15G_0$. But, the fabrication process has produced resistances at the upper limit of +15%, which makes the input conductance equal to $G_0$, i.e. $R_{IN} = Z_0$.

Although the operation of controlled impedance circuit 22 has been described for a multiplier 222 with a multiplication range from −1 to +1, other multiplication ranges may be used as well. As an example, some implementations of multiplier 222 for high-speed operation may have a multiplier range of 0 to +1. In this case, the input conductance would range from $G_{R1} + G_{R1A}$ when m is 0 to $G_{R1}$ when m is ±1. Doubling the nominal conductance of $R_{1A}$ (to $0.3 G_0$ in the case of a ±15% tolerance process) then provides the same adjustment range as before.

The controlled input impedance circuit 22, thus, can vary the input impedance, in response to the multiplier m signal, so that the input impedance $R_{IN}$ can always be maintained at the characteristic impedance $Z_0$ of the transmission line 10 over the entire range of absolute resistance values produced by the IC fabrication process and operating temperature. The multiplier signal m, from the controller circuit 24, is generated in response to an external reference impedance $R_{ref}$ in a manner described below, and operates to maintain the input impedance $R_{IN}$ at a value which is related to the impedance of the external reference impedance $R_{ref}$.

On-chip resistors R21 and R22 are fabricated to have the same resistance value, and, thus, form a voltage divider that supplies a reference voltage of one half of the negative operating potential to one input terminal of amplifier 242. Although the absolute tolerances of the on-chip resistors may be ±15%, their relative tolerance will be much tighter, typically 0.5%. Thus the voltage derived from this voltage divider is relatively constant.

Feedback within amplifier 242 serves to hold its other input terminal, tied to the junction of $R_{ref}$ and R25, at the same voltage as the divider output. Thus, the junction of $R_{ref}$ and R25 will be held at the same voltage, that voltage being one half of the negative operating potential.

The resistor R25 is fabricated to nominally have the same resistance value as the external resistor $R_{ref}$. If the fabrication process and operating temperature for a particular chip produce on-chip resistors which are at their nominal values, then the resistance of the external resistor $R_{ref}$ will match that of the on-chip resistor R25, and their currents will be equal. Amplifier 242 then will see zero net input current at the input node connected to $R_{ref}$ and R25, and will in turn generate a multiplier signal m having the value zero. This in turn conditions the controlled input impedance circuit 22 to exhibit an input impedance $R_{IN}$ which is equal to the characteristic impedance $Z_0$ of the transmission line 10, as described above.

If the fabrication process and operating temperature for a particular chip produce on-chip resistors which are less than their nominal values, then the current flow through the external resistor $R_{ref}$ will be less than the current flow through R25. Amplifier 242 then will see a negative net input current at the input terminal connected to $R_{ref}$ and R25, and will in turn generate a multiplier signal m having a value greater than zero. On the other hand, if the fabrication process and operating temperature for a particular chip produce on-chip resistors which are greater than their nominal values, then the current flow through the external resistor $R_{ref}$ will be greater than the current flow through R25. Amplifier 242 then will see a positive net input current at the input terminal connected to $R_{ref}$ and R25, and will in turn generate a multiplier signal m having a value less than zero. In either case, the controlled input impedance circuit 22 is conditioned to generate an input impedance $R_{IN}$ which is equal to the characteristic impedance $Z_0$ of the transmission line 10, as described above.

In this manner, the controller circuit 24 produces a control signal m for the controlled input impedance circuit 22 which operates to maintain the input impedance $R_{in}$ at the characteristic impedance $Z_0$ of the transmission line 10. Controller circuit 24 produces the control signal m as a function of the ratio of the on-chip resistances to the external reference resistance. This control signal m may be supplied to all the controlled impedance circuits on the IC which connect to transmission lines. The selection of the nominal conductances of R1 and R1A in the controlled impedance circuit(s) 22 serve to set the particular termination impedance of each input or output node and to compensate for any differences in the designed multiplier range(s). Thus, only a single controller circuit 24 and external reference resistor is needed.

Figure 3:
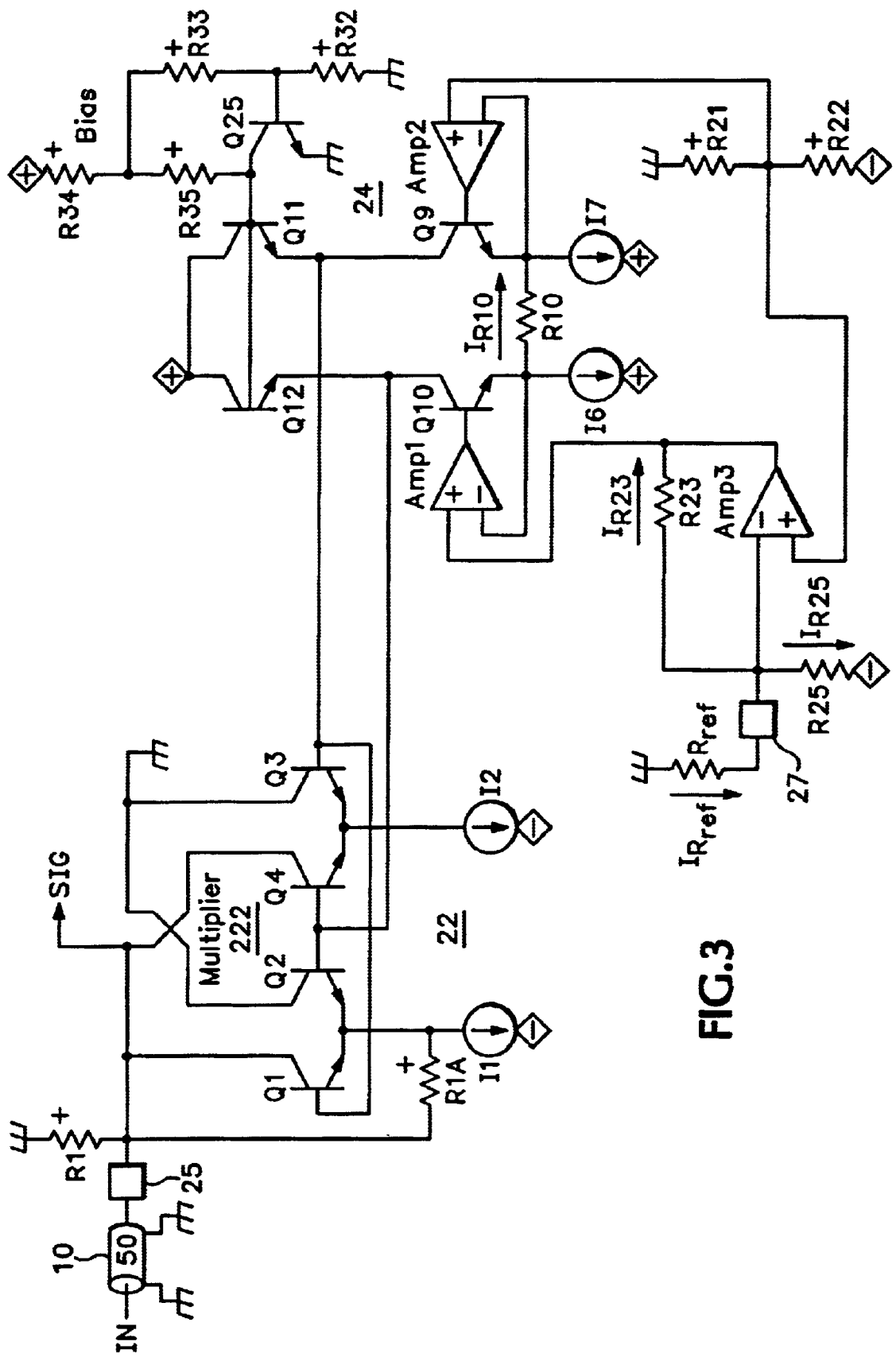
FIGS. 3, 4, 5, 6 and 7 are more detailed diagrams, partially in block form and partially in schematic form, of respective portions of the integrated circuit illustrated in FIG. 1.

FIG. 3 is a more detailed diagram, partially in block form, and partially in schematic form of a portion of the integrated circuit illustrated in FIG. 2. In FIG. 3, those elements which are the same as those illustrated in FIGS. 1 and 2 are designated by the same reference number and are not described in detail below.

In FIG. 3, input pad 25 is coupled to respective first electrodes of resistors R1 and R1A, to respective collector electrodes of NPN bipolar transistors Q1 and Q4, and to the signal processing circuitry 26 (not shown). Respective collector electrodes of transistors Q2 and Q3 are coupled to ground. Respective emitter electrodes of transistors Q1 and Q2 are coupled in common to a second electrode of resistor R1A and a first terminal of a first constant current source I1. A second terminal of the first constant current source I1 is coupled to the source of negative operating potential. Respective emitter electrodes of transistors Q3 and Q4 are coupled in common to a first terminal of a second constant current source I2. A second terminal of the second constant current is coupled to the source of negative operating potential. The combination of the transistors Q1 and Q2 and the first constant current source I1 form the multiplier 222 in the form of a known two-quadrant Gilbert multiplier (one with a multiplication range of 0 to +1), and the combination of the multiplier 222 and resistors R1 and R1A form the controlled input impedance circuit 22. Transistors Q3 and Q4, and the second constant current source I2, form a DC bias compensating circuit to compensate for changes in the DC bias current flowing through Q1 as a function of the control signal m.

One electrode of the external reference resistor $R_{ref}$ is coupled to ground, and the other electrode is coupled to the reference input pad 27. Reference input pad 27 is coupled to the first electrode of the resistor R25, a first electrode of a feedback resistor R23, and an inverting input terminal of an operational amplifier Amp 3. The second electrode of the resistor R25 is coupled to the source of negative operating potential. The first electrode of the resistor R21 is coupled to ground, and the second electrode of the resistor R21 is coupled to respective non-inverting input terminals of the amplifier Amp 3 and an operational amplifier Amp2, and to the first electrode of the resistor R22. The second electrode of the resistor R22 is coupled to the source of negative operating potential. An output terminal of the amplifier Amp 3 is coupled to a second electrode of the feedback resistor R23 and to a non-inverting input terminal of an operational amplifier Amp 1.

An output terminal of the amplifier Amp 1 is coupled to a base electrode of a bipolar NPN transistor Q10. An emitter electrode of the transistor Q10 is coupled to a first electrode of a resistor R10, to an input terminal of a constant current source I6 and to an inverting input terminal of the amplifier Amp 1. An output terminal of the amplifier Amp 2 is coupled to a base electrode of a bipolar NPN transistor Q9. An emitter electrode of the transistor Q9 is coupled to a second electrode of a resistor R10, to an input terminal of a constant current source I7 and to an inverting input terminal of the amplifier Amp 2. Respective output terminals of the current sources I6 and I7 are coupled in common to the source of negative operating potential.

A collector electrode of the transistor Q10 is coupled to an emitter electrode of a bipolar NPN transistor Q12, and to respective base electrodes of the transistors Q2 and Q4. A collector electrode of the transistor Q12 is coupled to a source of a positive operating potential, designated by a diamond with a "+" inside. A collector electrode of the transistor Q9 is coupled to an emitter electrode of a bipolar NPN transistor Q11, and to respective base electrodes of the transistors Q1 and Q3. A collector electrode of the transistor Q11 is coupled to the source of positive operating potential.

A first electrode of a resistor R34 is coupled to the source of positive operating potential, and a second electrode of the resistor R34 is coupled to respective first electrodes of resistors R35 and R33. A second electrode of the resistor R35 is coupled to a collector electrode of a bipolar NPN transistor Q25, and to respective base electrodes of the transistors Q11 and Q12. A second electrode of the resistor R33 is coupled to a base electrode of the transistor Q25 and to a first electrode of a resistor R32. A second electrode of the resistor R32 is coupled to ground. The emitter electrode of the transistor Q25 is also coupled to ground. The combination of amplifiers Amp 1, Amp 2 and Amp 3; transistors Q9, Q10, Q11, Q12 and Q25; resistors R10, R21, R22, R23, R25, R32, R33, R34 and R35; and current sources I6 and I7 form the controller circuit 24.

The Gilbert multiplier 222 operates in a known manner to take its input current from the resistor R1A, and generate its output current at the collector electrodes of the transistors Q1 and Q4. The output current is equal to the input current times a multiplier m represented by the signals at the respective base electrodes of transistors Q1 and Q3 and transistors Q2 and Q4. The multiplier m is given in equation $$m = \frac{I_{Q12}}{I_{Q12} + I_{Q11}} \qquad (2)$$

(2), where $I_{Q11}$ is the current through the main conduction path (e.g. collector-emitter path) of the transistor Q11 and $I_{Q12}$ is the current through the main conduction path of the transistor Q12. That is, when no current flows through Q11, then the multiplier m is +1, when no current flows through Q12, the multiplier m is 0, and when equal currents flow through Q11 and Q12, the multiplier is 0.5

The currents $I_{Q11}$ and $I_{Q12}$, flowing through the transistors Q11 and Q12, respectively, are controlled by the transistors Q9 and Q10, and the current sources I6 and I7. The sum of the currents $I_{Q11}$ and $I_{Q12}$ is equal to the sum of the currents I6 and I7, which are equal to each other. The current through transistor Q9 is I7–$I_{R10}$, and the current through transistor Q10 is I6+$I_{R10}$. Thus, the multiplier signal m is given in equation (3), noting that $I_{R10}=V_{R10}/R_{10}$.

$$m = \frac{I_6 + I_{R10}}{(I_6 + I_7)} = 0.5 + \frac{I_{R10}}{2 * I_6} = 0.5 + \frac{V_{R10}}{2 * I_6 * R_{10}} \qquad (3)$$

The biasing circuit formed by resistors R32, R33, R34, R35 and transistor Q25 serves to set proper operating voltages for transistors Q1, Q2, Q3, and Q4.

Referring to FIG. 3, the operational amplifiers Amp 1, Amp 2 and Amp 3 all operate, in the known manner, to maintain the voltage between their respective inverting and non-inverting input terminals at zero volts. Thus, a loop is formed by the resistor R10, respective input terminals of amplifier Amp 1, the resistor R23, respective input terminals of amplifier Amp 3, and respective input terminals of amplifier Amp 2 back to resistor R10. The voltage around the loop, e.g. the voltage across the resistor R10, $V_{R10}$, plus the $$m = 0.5 - \frac{V_{R23}}{2*I_6*R_{10}} = 0.5 - \frac{(I_{R23}*R_{23})}{2*I_6*R_{10}} \quad (4)$$

voltage across the resistor R23, $V_{R23}$ is zero volts. Thus, $V_{R10} = -V_{R23}$. The multiplier signal m, thus, is given in equation (4).

Referring again to FIG. 3, the current $I_{R23}$ is equal to $I_{Rref}-I_{R25}$. $I_{Rref}$, in turn is equal to $V_{Rref}|G_{Rref}$; and $I_{R25}$ is equal to $V_{R25}|G_{R25}$. Substituting into equation (4) results in the multiplier signal given in equation (5):

$$m = 0.5 - \frac{R_{23}}{2*I_6*R_{10}}(V_{Rref}*G_{Rref} - V_{R25}*G_{R25}) \quad (5)$$

Substituting equation (5) into equation (1) results in equation (6):

$$G_{in} = \quad (6)$$

$$G_1 + G_{1A} - 0.5G_{1A} + \left(\frac{G_{1A}*R_{23}}{2*I_6*R_{10}}\right)(V_{Rref}*G_{Rref} - V_{R25}*G_{R25}) =$$

$$\left(\frac{G_{1A}*V_{Rref}*R_{23}}{2*I_6*R_{10}}\right)G_{Rref} +$$

$$\left(G_1 + 0.5*G_{1A} - \frac{G_{1A}*V_{R25}*G_{R25}*R_{23}}{2*I_6*R_{10}}\right)$$

The second term of equation (6), which depends only on the values of components internal to the IC, may be set to zero by appropriate selection of component values, based on resistor ratioing, all in a known manner. Similarly, the coefficient of $G_{Rref}$ in the first term may be set to a constant value K over temperature and operating supply voltage variations by appropriate selection of component values, based on resistor ratioing, also in a known manner.

The input conductance, thus, is $G_{in}=K|G_{Rref}$. Consequently, the input impedance $R_{in}$ is dependent only on the value of the external reference resistor $R_{ref}$. The absolute tolerance of the input impedance $R_{in}$, thus, is determined solely by the absolute tolerance of the external reference resistor $R_{ref}$.

Figure 4:
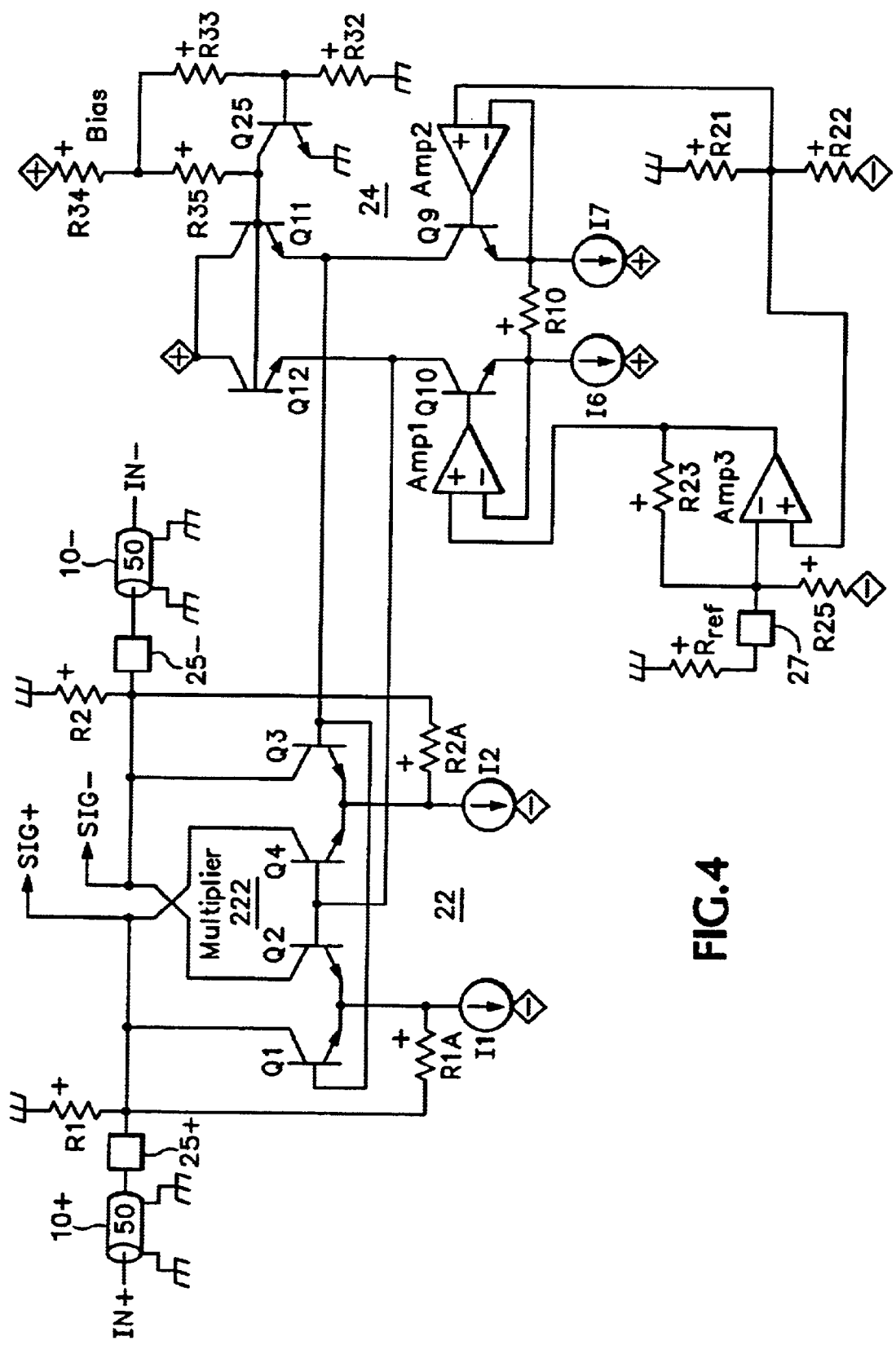

FIG. 4 is a diagram similar to FIG. 3 illustrating a differential configuration of the termination circuit of an IC 20. Those elements which are the same as those illustrated in FIG. 3 are designated with the same reference number and are not described in detail below. FIG. 4 illustrates an embodiment which can properly maintain the input impedance of a pair of input terminals coupled to receive a differential input signal consisting of a positive input signal IN+ and a negative input signal IN−. One skilled in the art will understand the references to positive and negative input signals refer to the differential nature of the input signal, and are not meant to describe the absolute voltage of either of those signals.

In FIG. 4, the positive input signal IN+ is coupled to a first terminal of a first transmission line 10+, which corresponds to the transmission line 10 in FIG. 3. A second terminal of the first transmission line 10+ is coupled to a first input pad 25+, which corresponds to input pad 25 in FIG. 3. The first input pad 25+ carries the positive input signal SIG+, and is coupled to a positive input signal terminal of the signal processing circuit 26 (of FIG. 1, not shown). The negative input signal IN− is coupled to a first terminal of a second transmission line 10−. A second terminal of the second transmission line 10− is coupled to a second input pad 25−. The second input pad 25− is coupled to the respective first electrodes of the resistors R2, R2A, to respective collector electrodes of the transistors Q2 and Q3, and to a negative input signal terminal of the signal processing circuit 26. The remainder of the circuit illustrated in FIG. 4 is the same as that illustrated in FIG. 3, and will not be described in detail below.

In operation, the circuit illustrated in FIG. 4 differs from that of the circuit illustrated in FIG. 3 only in that the Gilbert multiplier 222 operates in a differential mode as a four-quadrant multiplier (one with a multiplication range of −1 to +1), in a known manner.

Following the same analysis as for FIG. 3, but with the increased multiplier range of −1 to +1, yields an input conductance as given in equation (7):

$$G_{in} = \quad (7)$$

$$\left(\frac{G_{1A}*V_{Rref}*R_{23}}{I_6*R_{10}}\right)G_{Rref} + \left(G_1 + G_{1A} - \frac{G_{1A}*V_{R25}*G_{R25}*R_{23}}{I_6*R_{10}}\right)$$

This differs from equation (6) only in doubling the coefficients of $G_{1A}$. Thus use of the four-quadrant multiplier as shown in FIG. 4 allows for the same advantages as the circuit shown in FIG. 3, while using half the value of $G_{1A}$. This reduces the amount of signal current flowing through, and therefore the required bias current standing in, the multiplier transistors Q1, Q2, Q3, and Q4.

In both FIGS. 3 and 4, the constant current sources I1 and I2 coupled to the multiplier 222 operate to provide current bias for the bipolar transistors Q1, Q2, Q3 and Q4. That is, the constant quiescent current for the transistors Q1, Q2, Q3 and Q4, in conjunction with the bias circuit (R32, R33, R34, R35 and Q25), conditions the bipolar transistors Q1, Q2, Q3 and Q4 to remain in the active operating region. This permits an AC input signal IN (for FIG. 3), or differential input signals IN+ and IN−, to be received without driving the transistors into a non-linear operating region. This also has the effect of providing a quiescent DC bias for the single ended configuration illustrated in FIG. 3, or a common mode voltage for the differential configuration illustrated in FIG. 4, which may or may not be desirable.

Figure 5:
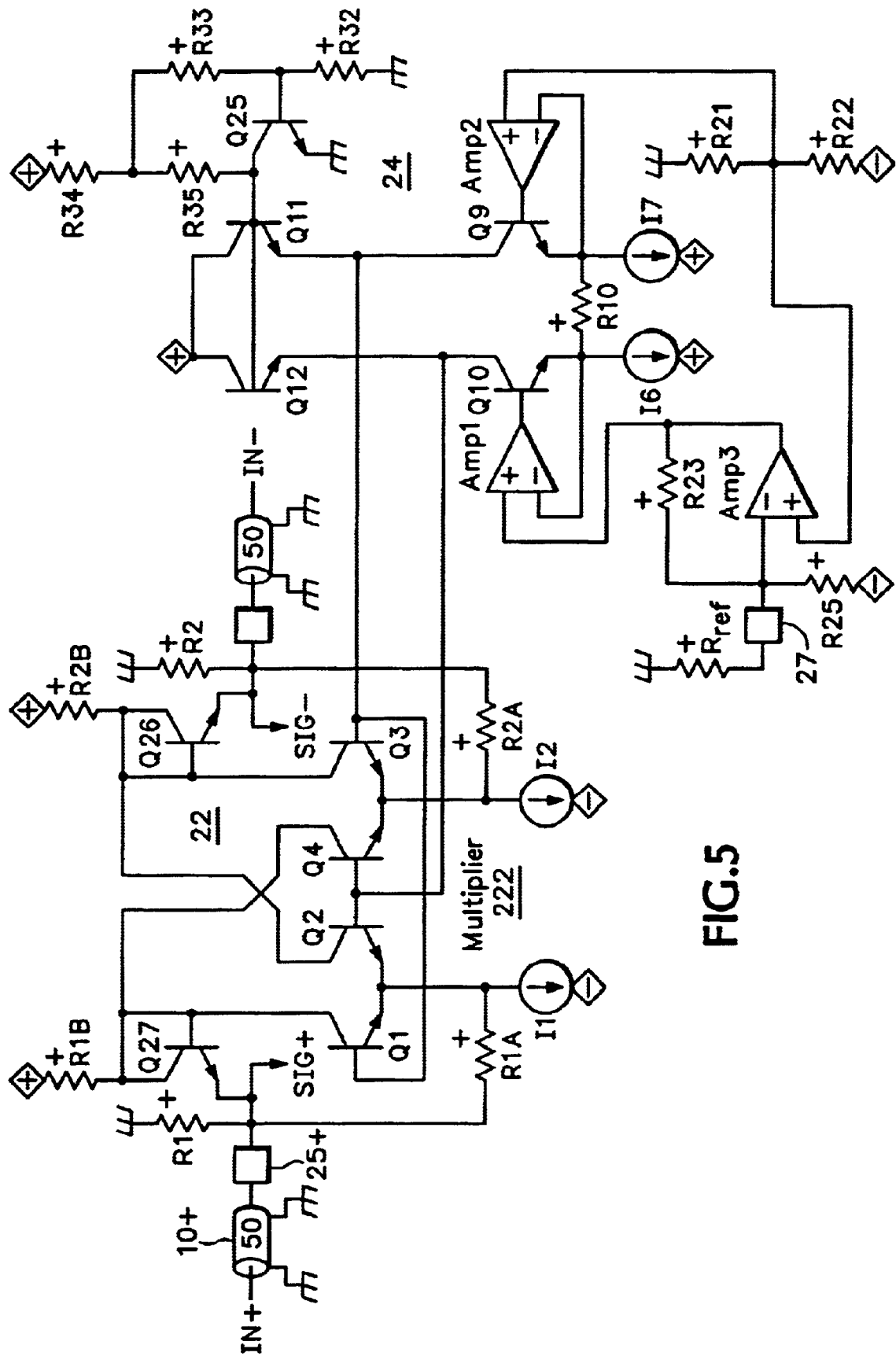

FIG. 5 illustrates an embodiment for minimizing the common mode voltage and increasing the dynamic range of the termination circuit. Elements which are the same as those illustrated in FIGS. 3 and 4 are designated by the same reference number and are not described in detail below.

In FIG. 5, the input pad 25+ is coupled to the positive input terminal SIG+ of the signal processing circuit 26 (of FIG. 1, not shown), and to an emitter electrode of a bipolar NPN transistor Q27. A base electrode of the transistor Q27 is coupled to respective collector electrodes of the transistors Q1, Q4 and Q27, and to a first electrode of a resistor R1B. The input pad 25− is coupled to the negative input terminal SIG− of the signal processing circuit 26, and to an emitter electrode of a bipolar NPN transistor Q26. A base electrode of the transistor Q26 is coupled to respective collector electrodes of the transistors Q2, Q3 and Q26, and to a first electrode of a resistor R2B. The respective second electrodes of resistors R1B and R2B are coupled in common to the source of positive operating potential.

In operation, the transistors Q26 and Q27 are both connected in a diode configuration, and operate to increase the collector-emitter voltages (VCE) of the multiplier 222 transistors Q1, Q2, Q3 and Q4. This, in turn, increases the dynamic range of the circuit without requiring an increase in the currents through current sources I1 and I2. The embodiment illustrated in FIG. 5 also forms Thevenin equivalents for resistors R1 and R2 by adding to each the combination of a diode connected transistor and load resistor (Q27 and R1B, and Q26 and R2B, respectively). This arrangement minimizes the DC offset of a single ended configuration (FIG. 3) and the common mode voltage of the differential configuration (FIG. 4). One skilled in the art will understand that DC offset and common mode voltage is minimized when the current sources I1 and I2 track the currents through the resistors R1B and R2B, respectively.

Figure 6:
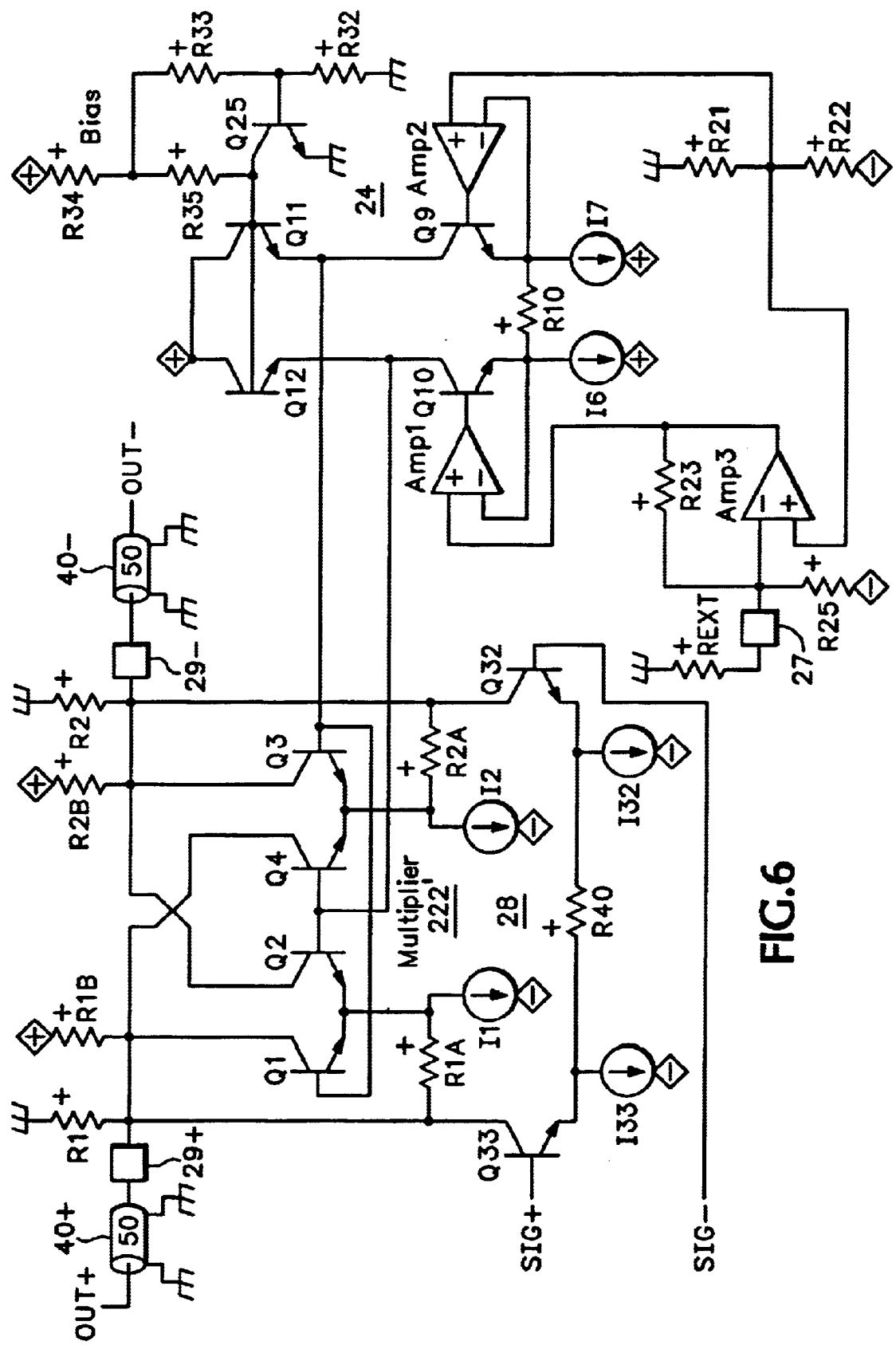

FIG. 6 is a diagram illustrating an embodiment of a controlled output impedance circuit 28, corresponding to the differential controlled input impedance circuit 22 illustrated in FIG. 4. In FIG. 6, those elements which are the same as those illustrated in FIG. 4 are designated by the same reference numbers, and are not described in detail below.

In FIG. 6, the controlled output impedance circuit 28 contains a multiplier 222", arranged in the same manner as the multiplier 222 in the controlled input impedance circuit 22 (of FIG. 4). The multiplier 222" operates in conjunction with the controller circuit 24 (also of FIG. 4) as described above with reference to FIG. 4. A positive output signal SIG+ from the signal processing circuit 26 (of FIG. 1, not shown) is coupled to a base electrode of a bipolar NPN transistor Q33. An emitter electrode of the transistor Q33 is coupled to a first electrode of a resistor R40 and a first terminal of a constant current source I33. A second terminal of the constant current source I33 is coupled to the source of negative operating potential. A collector electrode of the transistor Q33 is coupled to respective first electrodes of the resistors R1, R1A and R1B, to the positive output terminal of the multiplier 222" (i.e. the commonly connected collector electrodes of the transistors Q1 and Q4), and to the output pad 29+. A second electrode of the resistor R1B is coupled to the source of positive operating potential, and a second electrode of the resistor R1 is coupled to ground. Output pad 29+ is coupled to a first terminal of a first transmission line 40+. A second terminal of the first transmission line 40+ produces the positive output signal OUT+, and is coupled to utilization circuitry (not shown).

A negative output signal SIG− from the signal processing circuit 26 (of FIG. 1, not shown) is coupled to a base electrode of a bipolar NPN transistor Q32. An emitter electrode of the transistor Q32 is coupled to a second electrode of the resistor R40 and a first terminal of a constant current source I32. A second terminal of the constant current source I32 is coupled to the source of negative operating potential. A collector electrode of the transistor Q32 is coupled to respective first electrodes of the resistors R2, R2A and R2B, to the negative output terminal of the multiplier 222" (i.e. the commonly connected collector electrodes of the transistors Q2 and Q3), and to the output pad 29−. A second electrode of the resistor R2B is coupled to the source of positive operating potential, and a second electrode of the resistor R2 is coupled to ground. Output pad 29− is coupled to a first terminal of a second transmission line 40−. A second terminal of the second transmission line 40− produces the negative output signal OUT−, and is coupled to utilization circuitry (not shown).

In operation, the controller circuit 24 controls the multiplier 222" in the same manner described above with respect to the embodiment illustrated in FIG. 4. The output impedance of the transmission line driver is, thus, maintained at the characteristic impedance $Z_0$ of the transmission line (40+,40−). The transistors Q32 and Q33, the current sources I32 and I33, and the resistor R40 operate in combination as a differential amplifier. The load resistance of the differential amplifier is the output impedance $Z_0$ of the transmission line driver, which is controlled to be the characteristic impedance of the transmission line (40+,40−) as described above. The differential output signal SIG can be coupled to the transmission line pair (40+,40−) with an output impedance which is the characteristic impedance of the transmission lines (40+,40−).

In FIG. 6, the transconductance $G_m$ of the differential amplifier formed by transistors Q32 and Q33 and resistor R40 is inversely proportional to the on-chip resistor R40 (see $$G_m = \frac{I_{out}}{V_{in}} \propto \frac{1}{R_{40}} \tag{8}$$

equation (8)). The output current $I_{out}$ from the differential amplifier, passing through the load resistance $Z_0$, generates an output voltage $V_{out}$. The voltage gain $V_{out}/V_{in}$ is given in equation (9):

$$\frac{V_{out}}{V_{in}} = \frac{I_{out} Z_0}{V_{in}} \propto \frac{Z_0}{R_{40}} \tag{9}$$

However, while the resistor R40 varies due to the fabrication process and operating temperature of the IC, the output impedance $Z_0$ is controlled to a constant value of the characteristic impedance of the transmission line (40+,40−), as described above. This results in the voltage gain of the differential amplifier having a tolerance which is inverse to that of the IC resistors. As described above, the fabrication absolute tolerance of the components fabricated on an IC can be ±15%. This voltage gain tolerance may be too wide for some applications.

Figure 7:
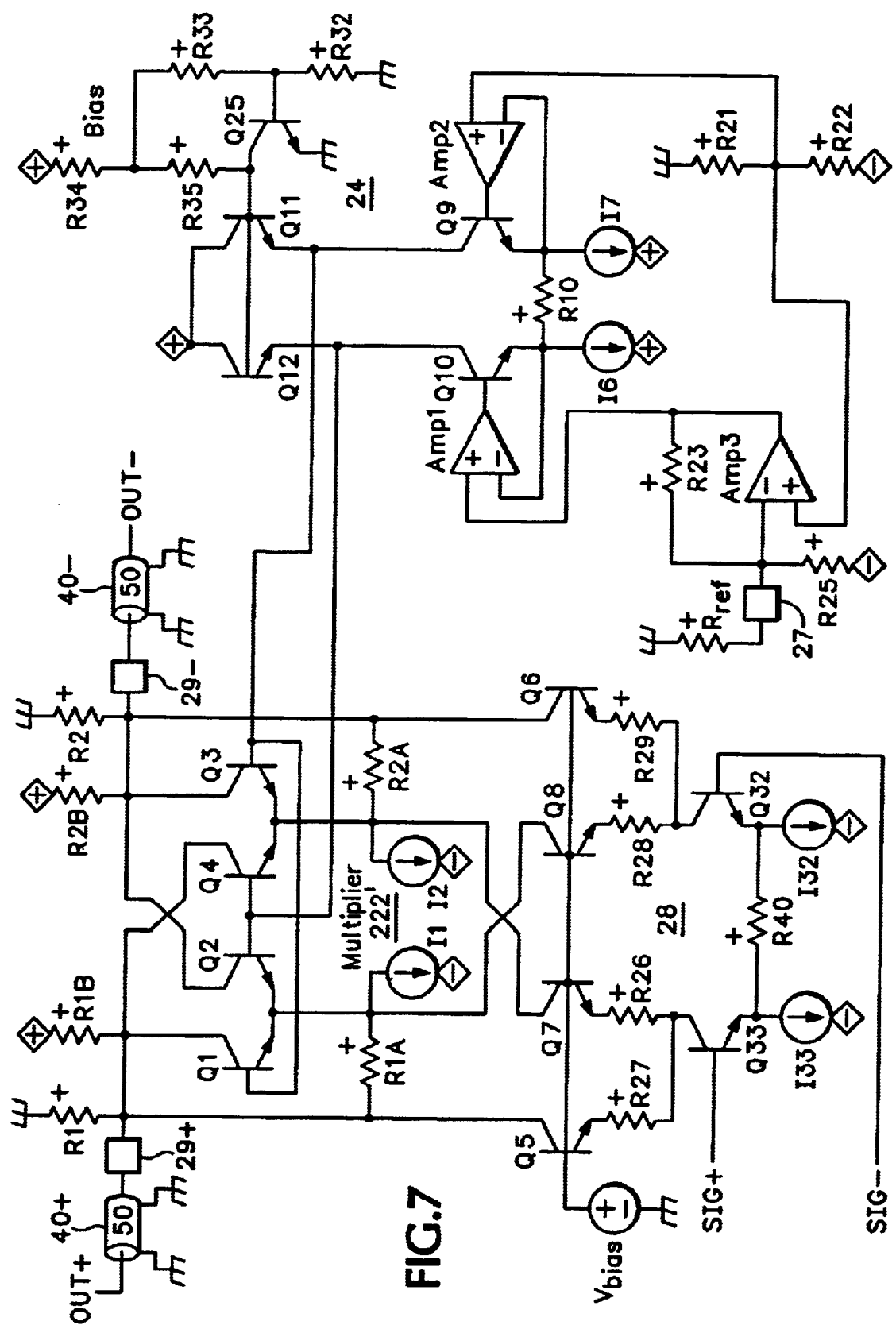

FIG. 7 is a diagram of a controlled output impedance circuit 28 as illustrated in FIG. 6, modified to maintain the voltage gain of the output differential amplifier constant, independent of the resistor fabrication absolute tolerance. Those elements in FIG. 7 which are the same as illustrated in FIG. 6 are designated by the same reference number, and are not described in detail below.

In FIG. 7, the collector electrode of the transistor Q33 is coupled to respective first electrodes of a resistor R27 and a resistor R26. A second electrode of the resistor R27 is coupled to an emitter electrode of a bipolar NPN transistor Q5. A collector electrode of the transistor Q5 is coupled to respective first electrodes of resistors R1A, R1B and R1, to the positive output terminal of the multiplier 222" (consisting of commonly connected collector electrodes of the transistors Q1 and Q4) and the positive output pad 29+. The collector electrode of the transistor Q32 is coupled to respective first electrodes of a resistor R29 and a resistor R28. A second electrode of the resistor R29 is coupled to an emitter electrode of a bipolar NPN transistor Q6. A collector electrode of the transistor Q6 is coupled to respective first electrodes of resistors R2A, R2B and R2, to the negative output terminal of the multiplier 222" (consisting of commonly connected collector electrodes of the transistors Q2 and Q3) and the negative output pad 29−. A second electrode of the resistor R26 is coupled to the emitter electrode of a transistor Q7, and a second electrode of the resistor R28 is coupled to the emitter electrode of a transistor Q8.

A collector electrode of the transistor Q7 is coupled to the first terminal of the constant current source I2, the second electrode of the resistor R2A, and to the commonly connected emitter electrodes of the transistors Q3 and Q4. A collector electrode of the transistor Q8 is coupled to the first terminal of the constant current source I1, the second electrode of the resistor R1A, and to the commonly connected emitter electrodes of the transistors Q1 and Q2. A source of a bias voltage Vbias is coupled in common to respective base electrodes of the transistors Q5, Q6, Q7 and Q8. The bias voltage is set to a value which will maintain the transistors Q5, Q6, Q7, Q8, Q32 and Q33 in their respective proper operating range, in a manner well known to one skilled in the art.

In operation, the differential currents passing through respective resistors R1A and R2A to the corresponding input terminals of the multiplier 222" each include a portion of the signal output current from the differential amplifier. Specifically, the proportion of the total signal current flowing through resistor R1A is equal to $G_{R1A}/(G_{R1}+G_{R1A}+G_{R1B})$. The ratio of the emitter area of transistor Q7 to that of transistor Q5, and the ratio of the conductance of the resistor R26 to that of the resistor R27, are both fabricated to be the same proportion, i.e. $G_{R1A}/(G_{R1}+G_{R1A}+G_{R1B})$. Similarly, the ratio of the emitter area of the transistor Q8 to that of the transistor Q6, and the ratio of the conductance of the resistor R28 to that of the resistor R29 is also fabricated to be the same proportion, i.e. $G_{R1A}/(G_{R1}+G_{R1A}+G_{R1B})$. This causes the portion of amplifier signal current through the transistor Q8 to be equal in magnitude, but opposite in polarity, to the portion of the signal current from the transistor Q5 flowing through the resistor R1A, and the portion of amplifier signal current flowing through the transistor Q7 to be equal in magnitude, but opposite in polarity, to the portion of the signal current from the transistor Q6 flowing through the resistor R2A.

Due to this arrangement, no signal current flows into the multiplier 222", and consequently no signal component appears in the output current from the multiplier 222", independent of the multiplication factor. The signal current gain at Q33 collector is $2*G_{R40}$, and at Q5 collector is $2*G_{R40}*(G_{R1A}+G_{R1}+G_{R1B}d)/(2*G_{R1A}+G_{R1}+G_{R1B})$. This current flowing into the parallel load of R1, R1A, and R1B generates an open-circuit output voltage gain of:

$$\frac{V_{out}}{V_{in}} = \frac{2*G_{R40}}{2*G_{R1A}+G_{R1}+G_{R1B}} \quad (10)$$

The gain with a properly matched load on the second terminal of the respective transmission lines (40+,40−) is one half of the voltage gain given in equation (10). As can be seen from equation (10), the voltage gain is dependent only upon on-chip resistor matching, and not upon the absolute resistor tolerance. Thus, the embodiment illustrated in FIG. 7 presents a transmission line driver which presents a constant output impedance and constant voltage gain independent of the IC fabrication process resistor tolerance.

The embodiments of the invention described above provide an input current to the multiplier by tapping a portion of the current through the termination resistors (R1A, R2A), and returning the output signal of the multiplier as a current directly to the signal input or output pads. Many other embodiments are within the scope of the invention. For example, FIG. 8 shows a differential output circuit according to the invention adapted for use with a series termination topology.

Figure 8:
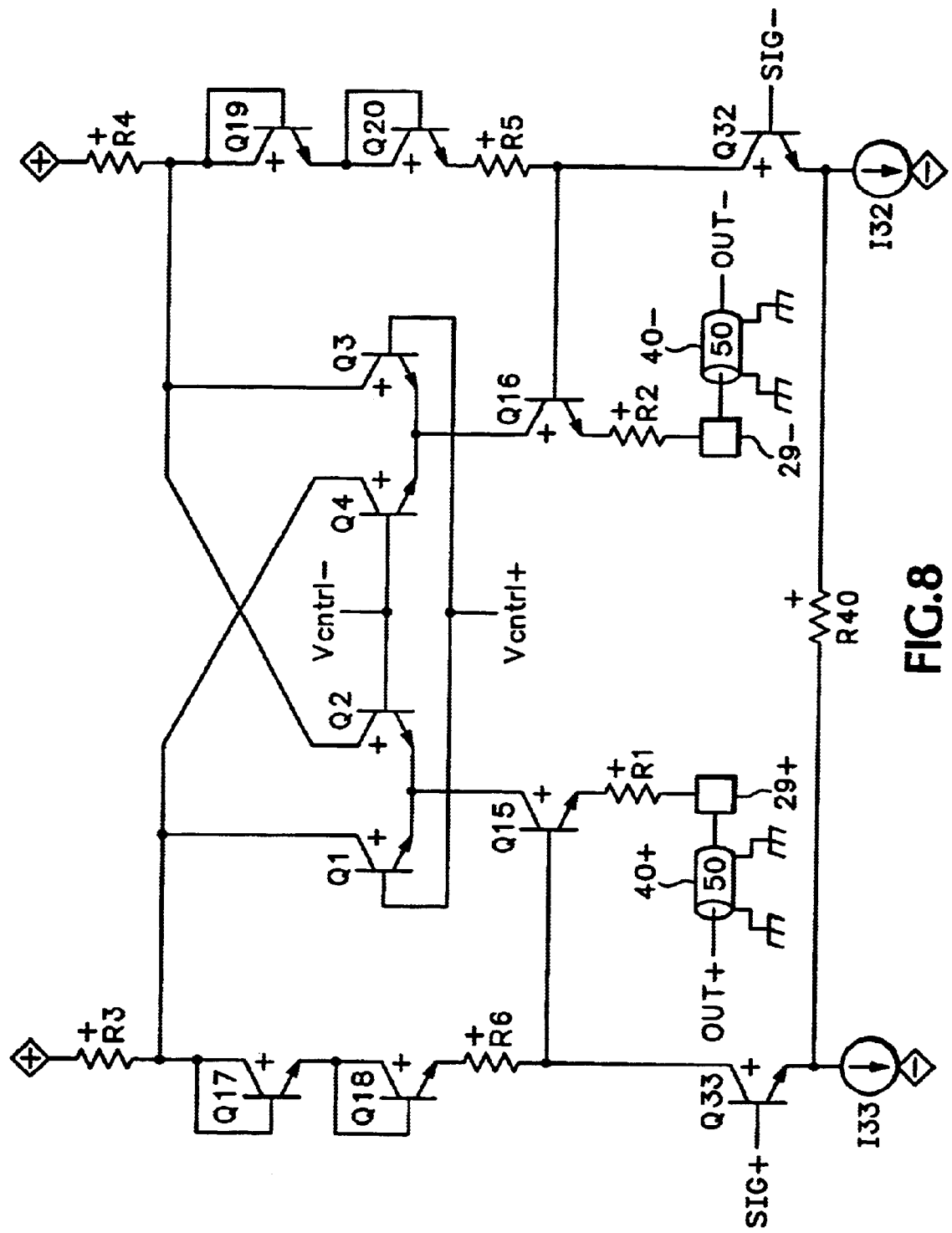
FIG. 8 is a schematic diagram of an alternate embodiment of the controlled impedance portion of FIG. 1.

In FIG. 8, those elements which are the same as those illustrated in FIGS. 3 through 7 are designated by the same reference numbers, and are not described in detail. In FIG. 8, control signal input terminals Vcntrl+ and Vcntrl− are coupled to the control circuit 24 (not shown), in the same manner illustrated in FIGS. 3 through 7. In FIG. 8, the collector electrode of the transistor Q33 is coupled to a first electrode of a resistor R6 and a base electrode of a transistor Q15. A collector electrode of the transistor Q15 is coupled to the commonly connected emitter electrodes of transistors Q1 and Q2. An emitter electrode of the transistor Q15 is coupled to a first electrode of the resistor R1. A second electrode of the resistor R1 is coupled to the output pad 29+. The commonly connected collector electrodes of transistors Q1 and Q4 are coupled to a first electrode of a resistor R3 and the collector and base electrodes of a transistor Q17. A second electrode of the resistor R3 is coupled to a source of a positive operating potential. An emitter electrode of the transistor Q17 is coupled to the collector and base electrodes of a transistor Q18. An emitter electrode of the transistor Q18 is coupled to a second electrode of the resistor R6. The collector electrode of the transistor Q32 is coupled to a first electrode of a resistor R5 and a base electrode of a transistor Q16. A collector electrode of the transistor Q16 is coupled to the commonly connected emitter electrodes of transistors Q3 and Q4. An emitter electrode of the transistor Q16 is coupled to a first electrode of the resistor R2. A second electrode of the resistor R2 is coupled to the output pad 29−. The commonly connected collector electrodes of transistors Q2 and Q3 are coupled to a first electrode of a resistor R4 and the collector and base electrodes of a transistor Q19. A second electrode of the resistor R4 is coupled to a source of a positive operating potential. An emitter electrode of the transistor Q19 is coupled to the collector and base electrodes of a transistor Q20. An emitter electrode of the transistor Q20 is coupled to a second electrode of the resistor R5.

In operation, transistors Q15 and Q16 act as emitter follower outputs for amplifier transistors Q33 and Q32, and resistors R1 and R2 act as series terminations for transmission lines connected to output pads 29+ and 29−. The full termination current is provided to the multiplier (a four-quadrant Gilbert multiplier consisting of Q1, Q2, Q3, and Q4) through transistors Q15 and Q16 acting as cascode stages, and the output of the multiplier is returned to the signal output pads through load resistors R3 and R4 and transistors Q15 and Q16 acting as emitter follower stages. The diode-connected transistors Q17, Q18, Q19, and Q20 serve as level-shift devices to provide appropriate operating voltages across transistors Q15, Q16, Q1, Q2, Q3, and Q4. In addition, the diode-loads provide for linearization of the amplifier formed by transistors Q33 and Q32 and resistor R40.

In the detailed description, above, the embodiment of the multiplier, the bias circuit, and control circuit was shown in a form which would be easily realizable by one skilled in the art. The skilled practitioner would also realize, however, that other embodiments of these elements are also possible, and would know how to design and fabricate these elements.

What is claimed is:

1. In an integrated circuit, a termination circuit for a transmission line having a predetermined characteristic impedance, comprising:
   a controllable impedance circuit, coupled to the transmission line;
   a reference impedance, external to the integrated circuit, having an impedance related to the characteristic impedance; and
   a control circuit, coupled to the reference impedance and the controllable impedance circuit, for conditioning the controllable impedance circuit to have the characteristic impedance responsive to the reference impedance.

2. The termination circuit of claim 1 wherein the controllable impedance circuit comprises a multiplier.

3. The termination circuit of claim 2 wherein the control circuit comprises:

a first impedance, coupled to the reference impedance, internal to the integrated circuit; and an amplifying circuit, coupled to the reference and first internal impedances, for generating a control signal related to the relative values of the reference and first internal impedances.

4. The termination circuit of claim 3 wherein the amplifying circuit comprises:

means for applying a given voltage to the reference and first internal impedances; means for subtracting the current through the reference impedance from the current through the first internal impedance; and means for producing the control signal as a function of the difference in currents.

5. The termination circuit of any one of claims 2, 3, or 4, wherein:

the multiplier has a multiplicand current input terminal responsive to at least a portion of the transmission line current, a multiplier input terminal responsive to the control signal from the control circuit, and a product current output terminal coupled to the transmission line.

6. The termination circuit of claim 5 wherein the product current output terminal is coupled to the transmission line through a voltage-shifting circuit whereby the dynamic range of the termination circuit is increased.

7. The termination circuit of claim 6 wherein the voltage-shifting circuit comprises a diode coupled between the product current output terminal of the multiplier and the transmission line.

8. The termination circuit of claim 5, wherein:

the termination circuit terminates a differential pair of transmission lines both having the characteristic impedance; and the multiplier is a four-quadrant Gilbert multiplier, having a positive multiplicand current input terminal coupled to a first one of the differential pair of transmission lines, a negative multiplicand current input terminal coupled to the other one of the differential pair of transmission lines, a positive product current output terminal coupled to the first one of the differential pair of transmission lines, and a negative product current output terminal coupled to the other one of the differential pair of transmission lines.

9. The termination circuit of claim 8, wherein the controllable impedance circuit further comprises:

a first resistor, coupled between the first one of the pair of differential transmission lines and a source of a reference potential;

a second resistor, coupled between the first one of the differential pair of transmission lines and the positive multiplicand current input terminal of the multiplier;

a third resistor, coupled between the other one of the differential pair of transmission lines and the source of reference potential; and a fourth resistor, coupled between the other one of the differential pair of transmission lines and the negative multiplicand current input terminal of the multiplier.

10. The termination circuit of claim 9, wherein the characteristic impedance is a resistance having a predetermined conductance value and resistors fabricated internal to the integrated circuit have an absolute tolerance of ±k, and the first and third resistors have a conductance value of substantially (1−k) times the characteristic conductance; and the second and fourth resistors have a conductance value of substantially k times the characteristic conductance.

11. The termination circuit of claim 8 wherein the termination circuit is a differential transmission line driver and further comprises a differential output amplifier coupled between a differential output terminal of signal processing circuitry internal to the integrated circuit and the differential pair of transmission lines.

12. The termination circuit of claim 8 wherein the termination circuit is a differential transmission line receiver and the differential pair of transmission lines is coupled to a differential input terminal of signal processing circuitry internal to the integrated circuit.

13. The termination circuit of claim 5 wherein the controllable impedance circuit further comprises:

a first resistor, coupled between the transmission line and a source of a reference potential; and a second resistor, coupled between the transmission line and the multiplicand current input terminal of the multiplier.

14. The termination circuit of claim 13, wherein the characteristic impedance is a resistance having a predetermined conductance value and resistors fabricated internal to the integrated circuit have an absolute tolerance of ±k, and the first resistor has a conductance value of substantially (1−k) times the characteristic conductance; and the second resistor has a conductance value of substantially 2*k times the characteristic conductance.

15. The termination circuit of claim 13 wherein the termination circuit is a transmission line driver and further comprises:

an output amplifier coupled between an output terminal of signal processing circuitry internal to the integrated circuit and the transmission line; and circuitry for maintaining a substantially constant gain of the output amplifier despite variations in the absolute value of resistors fabricated internal to the integrated circuit.

16. The termination circuit of claim 15 wherein:

the maintaining circuitry couples a portion of the signal current from the output amplifier to the multiplicand current input terminal of the multiplier whereby such portion substantially cancels the portion of the signal current flowing through the second resistor into the multiplicand current input terminal of the multiplier.

17. The termination circuit of claim 5 wherein the product current output terminal is coupled to the transmission line by direct connection to the transmission line.

18. The termination circuit of claim 1 wherein the termination circuit is a transmission line receiver and the transmission line is coupled to an input terminal of signal processing circuitry internal to the integrated circuit.

19. The termination circuit of claim 1 wherein the termination circuit is a transmission line driver and further comprises, an output amplifier coupled between an output terminal of signal processing circuitry internal to the integrated circuit and the transmission line.

20. In an integrated circuit, a termination circuit for a plurality of transmission lines, each transmission line having a respective predetermined characteristic impedance, comprising:

a plurality of controllable impedance circuits, each coupled to a corresponding one of the plurality of transmission lines;

a reference impedance, external to the integrated circuit, having an impedance related to the respective characteristic impedances; and a control circuit, coupled to the reference impedance and the plurality of controllable impedance circuits, for conditioning the plurality of controllable impendance circuits to have the characteristic impedances of their corresponding transmission lines responsive to the reference impedance.

* * * * *